(12) United States Patent
Heng et al.

(10) Patent No.: US 11,670,122 B2
(45) Date of Patent: Jun. 6, 2023

(54) DATA COLLECTION DEVICE AND METHOD, AND AUTONOMOUS DRIVING SYSTEM

(71) Applicant: Beijing xiaoma zhixing technology co.LTD, Beijing (CN)

(72) Inventors: Yufan Heng, Beijing (CN); Lintao Li, Beijing (CN); Zhiguo Yang, Beijing (CN); Chunlong Zhang, Beijing (CN)

(73) Assignee: Beijing xiaoma zhixing technology co.LTD, Beijing (CN)

( * ) Notice: Subject to any disclaimer, the term of this patent is extended or adjusted under 35 U.S.C. 154(b) by 286 days.

(21) Appl. No.: 17/070,950

(22) Filed: Oct. 15, 2020

(65) Prior Publication Data
US 2021/0109527 A1 Apr. 15, 2021

(30) Foreign Application Priority Data

Oct. 15, 2019 (CN) .......................... 201910980194.9
Oct. 16, 2019 (CN) .......................... 201910985285.1

(51) Int. Cl.
*G07C 5/08* (2006.01)
*B60R 16/023* (2006.01)
*G07C 5/00* (2006.01)

(52) U.S. Cl.
CPC ........ *G07C 5/0841* (2013.01); *B60R 16/0232* (2013.01); *G07C 5/008* (2013.01)

(58) Field of Classification Search
CPC .............. B60R 16/0232; G05D 1/0088; G05D 2201/0207; G07C 5/008; G07C 5/0841
See application file for complete search history.

(56) References Cited

U.S. PATENT DOCUMENTS

2015/0266455 A1* 9/2015 Wilson ................. G08G 1/0133
701/93
2018/0130347 A1* 5/2018 Ricci ................ G08G 1/096775

* cited by examiner

*Primary Examiner* — Nader Bolourchi
(74) *Attorney, Agent, or Firm* — Yu Gang (57) ABSTRACT

A data collection device and method, and an autonomous driving system are provided. The data collection device includes multiple sensor modules integrated on a circuit board, and a processor connected to the circuit board. The multiple sensor modules are configured to collect traveling information of a target vehicle in a traveling process. The processor is configured to send the traveling information to an Industrial Personal Computer (IPC) such that the IPC analyzes the traveling information and generates operation instructions.

19 Claims, 6 Drawing Sheets

DATA COLLECTION DEVICE AND METHOD, AND AUTONOMOUS DRIVING SYSTEM

TECHNICAL FIELD

The disclosure relates to the field of autonomous driving, and in particular, to a data collection device and method, and an autonomous driving system.

BACKGROUND

In the related art, in order to realize a data collection process in the autonomous driving of vehicles, a variety of sensors, such as a Global Navigation Satellite System (GNSS), an Inertial Measurement Unit (IMU), a laser radar (LiDAR) or other components, may be directly purchased for wiring in most cases. This design enables the wiring of a system capable of realizing autonomous driving to be complicated, and many other switching devices are needed. The stability is poor, the integration is low, the control is inflexible, the price is high, and it cannot be applied to batch autopilot vehicle modification.

Regarding the problems of complicated wiring and low stability of data collection devices in the related art, no effective solutions have been proposed.

SUMMARY

According to one embodiment of the disclosure, a data collection device is provided. The data collection device includes: a circuit board, integrated with multiple sensor modules for collecting traveling information of a target vehicle in a traveling process; and a processor, connected to the circuit board, and configured to send the traveling information to an Industrial Personal Computer (IPC) such that the IPC analyzes the traveling information and generates operation instructions.

Optionally, the processor is further configured to receive an operation instruction sent by the IPC, and control, in response to the operation instruction, the multiple sensors to be turned on or off respectively.

Optionally, the processor is further configured to determine, after receiving the operation instruction, whether a device identifier carried in the operation instruction is consistent with a device identifier of the data collection device, and respond to the operation instruction when the device identifier carried in the operation instruction is consistent with the device identifier of the data collection device.

Optionally, the processor is further configured to determine whether an address code in the operation instruction is consistent with a preset address code of the data collection device, and determine, if the address code is consistent with the preset address code, that the device identifier carried in the operation instruction is consistent with the device identifier of the data collection device.

Optionally, the processor is further configured to determine, after receiving the operation instruction sent by the IPC, an instruction type of the operation instruction, execute an operation corresponding to the instruction type on the multiple sensors according to the instruction type of the operation instruction, and send response data to the IPC.

Optionally, the processor is further configured to determine the instruction type of the operation instruction based on a function code in the operation instruction.

Optionally, the processor is further configured to read data corresponding to the operation instruction from the multiple sensors to obtain the response data when the instruction type of the operation instruction is a read operation type, write the data corresponding to the operation instruction to the multiple sensors based on the operation instruction when the instruction type of the operation instruction is a write operation type, and determine that the response data is write operation completion.

Optionally, the processor is further configured to sequentially control the multiple sensors to be reset in a resetting order, and receive the operation instruction sent by the IPC after the successful restoration of the multiple sensors.

Optionally, the processor is further configured to: enter an enabled status after power-on, and acquire a next sensor to be reset; switch the enabled status to a reset status, and judge whether the next sensor to be reset is reset successfully; and if the next sensor to be reset is reset successfully, switch the reset status to a waiting status, and after waiting for a preset time, switch the waiting status to the enabled status.

Optionally, the processor is further configured to acquire a current status and an initial status of the next sensor to be reset, and determine that the next sensor to be reset is successfully reset when the current status is the same as the initial status.

Optionally, the processor is further configured to: judge whether to return to a normal working status; if it is determined to return to the normal working status, switch the enabled status to a receiving status, and receive the operation instruction sent by the IPC; and if it is determined not to return to the normal working status, switch the enabled status to the waiting status.

Optionally, the processor is further configured to switch the receiving status to a sending status after the operation completion of the multiple sensors, and switch the sending status to the receiving status after sending the response data.

Optionally, the processor is further configured to receive a query instruction sent by the IPC, and send, in response to the query instruction, a query result to the IPC, the query result at least comprising: firmware version information of the multiple sensors.

Optionally, the data collection device further includes: a data interface. The processor is further configured to receive a change instruction through the data interface, and change a connection relationship of the multiple sensor modules in response to the change instruction.

Optionally, the data collection device further includes: a housing and a base. The circuit board and the processor are fixedly arranged in the housing, and the base is configured to fix the data collection device on the target vehicle.

According to another embodiment of the disclosure, a data collection method is provided, which is applied to the data collection device according to any one of the above and includes:

traveling information of a target vehicle in a traveling process is collected using multiple sensor modules; and the traveling information is sent to an IPC using a processor, such that the IPC analyzes the traveling information and generates operation instructions.

Optionally, the method further includes: an operation instruction sent by the IPC is received using the processor, and the multiple sensors are controlled to be turned on or off respectively in response to the operation instruction using the processor.

Optionally, the method further includes: after receiving the operation instruction, it is determined whether a device identifier carried in the operation instruction is consistent with a device identifier of the data collection device using the processor, and the operation instruction is responded using the processor when the device identifier carried in the operation instruction is consistent with the device identifier of the data collection device.

Optionally, the method further includes: after receiving the operation instruction sent by the IPC, an instruction type of the operation instruction is determined using the processor, an operation corresponding to the instruction type is executed on the multiple sensors according to the instruction type of the operation instruction, and response data is sent to the IPC using the processor.

Optionally, the method further includes: a query instruction sent by the IPC is received using the processor, and in response to the query instruction, a query result is sent to the IPC using the processor, the query result at least including: firmware version information of the multiple sensors.

Optionally, the method further includes: a change instruction is received through a data interface using the processor, and a connection relationship of the multiple sensor modules is changed in response to the change instruction using the processor, the data collection device further including: the data interface.

According to yet another embodiment of the disclosure, an autonomous driving system is further provided, which includes the data collection device according to any one of the above.

BRIEF DESCRIPTION OF THE DRAWINGS

The accompanying drawings described herein are used to provide a further understanding of the disclosure, and constitute a part of the present application, and the exemplary embodiments of the disclosure and the description thereof are used to explain the disclosure, but do not constitute improper limitations to the disclosure. In the drawings.

DETAILED DESCRIPTION OF THE EMBODIMENTS

The disclosure will be described in detail below with reference to the drawings in conjunction with the embodiments. It is to be noted that embodiments in the present application and characteristics in the embodiments may be combined under the condition of no conflicts.

It is to be noted that the specification and claims of the disclosure and the terms "first", "second" and the like in the drawings are used to distinguish similar objects, and do not need to describe a specific sequence or a precedence order.

Embodiment 1

In the present embodiment, a data collection device is provided. The device is configured to implement data collection, and may particularly implement data collection in an unmanned traveling process. As used below, the term "module" may implement a combination of software and/or hardware of a predetermined function. Although the apparatus described in the following embodiments is preferably implemented in software, hardware, or a combination of software and hardware, is also possible and contemplated.

Figure 1:
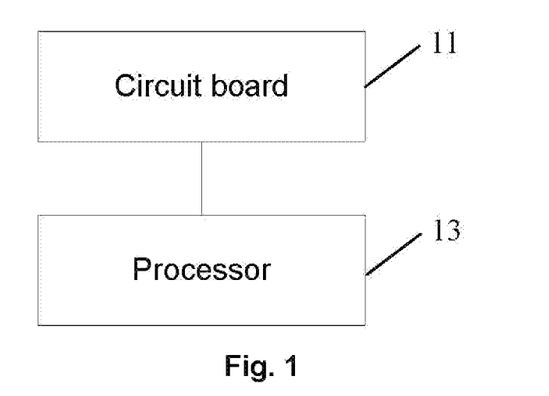
FIG. 1 is a structural block diagram of a data collection device according to an embodiment of the disclosure.

FIG. 1 is a structural block diagram of a data collection device according to an embodiment of the disclosure. As shown in FIG. 1, the device includes a circuit board 11 and a processor 13.

The circuit board 11 is integrated with multiple sensor modules for collecting traveling information of a target vehicle in a traveling process.

The processor 13 is connected to the circuit board, and configured to send the traveling information to an IPC such that the IPC analyzes the traveling information and generates operation instructions.

Through the embodiment of the disclosure, the data collection device includes multiple sensor modules integrated on a circuit board, and a processor connected to the circuit board. The multiple sensor modules are configured to collect traveling information of a target vehicle in a traveling process. The processor is configured to send the collected traveling information to an IPC such that the IPC analyzes the traveling information and generates operation instructions. Therefore, the problems of complicated wiring and low stability of a data acquisition device in the related art can be solved, and the effect of high stability without wiring and switching devices can be achieved.

It should be noted that the traveling information may include at least one of environmental information around a vehicle, positioning information of the vehicle, and posture information of the vehicle, and these information are used to realize autonomous driving of the vehicle. The environmental information around the vehicle may include information about other vehicles, pedestrians, and roads (such as road conditions, lane lines, traffic lights) in the environmental where the vehicle is located. The positioning information of the vehicle may include information such as the road and city where the vehicle is located. The posture information of the vehicle may include the direction angle, front and rear pitch angle, and left and right roll angle of the vehicle. The sensor modules may be at least one of the following: an IMU module, a LiDAR module, a Global Positioning System (GPS) module, an Inertial Navigation System (INS) module, an ETC module, an antenna module, and the like. The IPC may be an industrial personal computer, which is configured for the control and data collection of unmanned vehicles.

In some cases, a user needs to turn on or off one or more of the multiple sensors, which can be controlled by the IPC. For example, the processor in the data collection device may receive an operation instruction sent by the IPC, and control, in response to the operation instruction, the multiple sensors to be turned on or off respectively.

In an optional implementation manner, the processor is further configured to determine, after receiving the operation instruction, whether a device identifier carried in the operation instruction is consistent with a device identifier of the data collection device, and respond to the operation instruction when the device identifier carried in the operation instruction is consistent with the device identifier of the data collection device. It should be noted that since one IPC may control multiple data collection devices, it is also necessary to distinguish the operation instructions sent to each of the multiple data collection devices to avoid mis-sending. Therefore, a device identifier of a target data collection device sent by the instruction may be attached to the operation instruction, for example, device address information of the target data collection device sent by the instruction, so that when the data collection device receives the operation instruction, the processor may be used for analyzing to judge whether the operation instruction is an operation instruction sent to itself, for example, judge whether the device address information carried in the operation instruction is its own device address. If it is an operation instruction sent to itself, the operation instruction may be further analyzed. If it is not an operation instruction sent to itself, the execution may be rejected. Responding to the operation instruction may include: sending a feedback message to the IPC.

Figure 2:
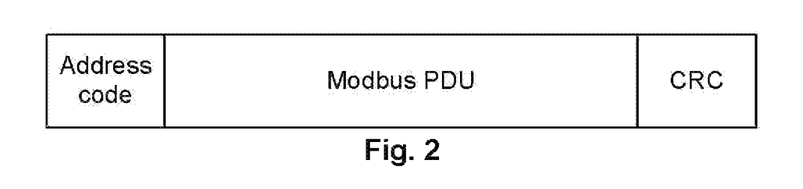
FIG. 2 is a schematic diagram of a data frame format of an MODBUS-RTU protocol according to an optional embodiment of the disclosure.

In an optional implementation manner, the processor may determine, after receiving the operation instruction sent by the IPC, whether an address code in the operation instruction is consistent with a preset address code of the data collection device, and determine, if the address code is consistent with the preset address code, that the device identifier carried in the operation instruction is consistent with the device identifier of the data collection device. It should be noted that a data communication between the IPC and an N-Box lower computer adopts an MODBUS-RTU protocol. Modbus RTU is a compact and uses binary representation of data. The data frame format is shown in FIG. 2, mainly including: an address code, a Modbus Protocol Data Unit (PDU), and a Cyclic Redundancy Check (CRC). The PDU consists of a function code and a data segment of a Modbus frame. In order to ensure the security of the instruction, after receiving the instruction sent by the IPC, the N-Box2 lower computer may parse the address code and compare whether the address code is consistent with a local address code (that is, the preset address code). If they are consistent, it may be determined that the device identifier carried in the operation instruction is consistent with the device identifier of the data collection device.

In an optional implementation manner, the processor may determine, after receiving the operation instruction sent by the IPC, an instruction type of the operation instruction, execute an operation corresponding to the instruction type on the multiple sensors according to the instruction type of the operation instruction, and send response data to the IPC. It should be noted that the processor may determine the instruction content of the operation instruction according to the type of the operation instruction. For example, when the operation instruction carries a first function code, the operation instruction may be regarded as type 1, and the operation instruction of type 1 may be used to indicate a certain operation. For example, when the operation instruction carries a second function code, the operation instruction may be considered to be type 2, and the operation instruction of type 2 may be used to indicate another operation. For example, the processor may determine the type of the operation instruction according to the function code carried in the operation instruction, and the function code may distinguish the type of operation. For example, the function code may be used to indicate whether the operation instruction is a query instruction or a control instruction. The query instruction may be used to indicate the query of a current sensor status. The control instruction may be used to indicate the control of a current sensor switch. The response data may be data obtained by operating the sensor. For example, when the operation instruction is a control instruction, the response data may be data on the execution of the sensor. When the operation instruction is a collection instruction, the response data may be data collected by the sensor.

In an implementation manner, function codes may be divided into two types: one is a read operation type, and the operation instruction of this type is a collection instruction; the other is a write operation type, and the operation instruction of this type is a control instruction. The processor may read data corresponding to the operation instruction from the multiple sensors to obtain the response data when the instruction type of the operation instruction is a read operation type. The processor may write the data corresponding to the operation instruction to the multiple sensors based on the operation instruction when the instruction type of the operation instruction is a write operation type, and determine that the response data is write operation completion.

In an optional implementation manner, the processor is further configured to sequentially control the multiple sensors to be reset in a resetting order, and receive the operation instruction sent by the IPC after the successful restoration of the multiple sensors. It should be noted that the reset may refer to initializing the sensor and switching the sensor to an initial status. Since the initial status of different sensors is not the same, some sensors have an initial status of on, and some sensors have an initial status of off. Therefore, the sensor initialization may be completed by powering on and off the sensor. The N-Box2 lower computer may perform power-on and power-off control at different intervals according to the characteristics of each of the multiple sensors. After the multiple sensors are initialized, it enters a receiving status and waits for the IPC to send an instruction.

Figure 3:
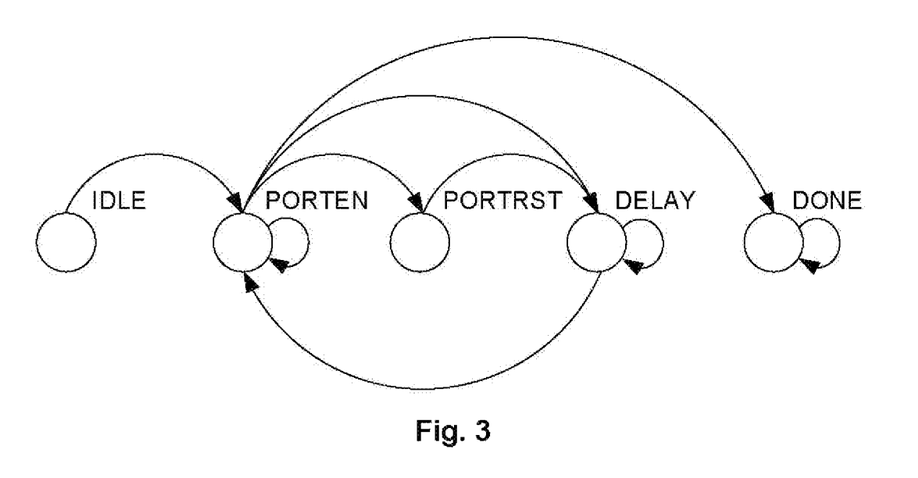
FIG. 3 is a schematic diagram of status machine transition of an N-Box2 lower machine according to an optional embodiment of the disclosure.

In an implementation manner, the processor is further configured to: enter an enabled status after power-on, and acquire a next sensor to be reset; switch the enabled status to a reset status, and judge whether the next sensor to be reset is reset successfully; and if the next sensor to be reset is reset successfully, switch the reset status to a waiting status, and after waiting for a preset time, switch the waiting status to the enabled status. It should be noted that the preset time may be an interval time determined according to the characteristics of each of the multiple sensors. The N-Box2 lower computer may use a status jump mode to reset each of the multiple sensors. As shown in FIG. 3, five statuses, namely an IDLE (idle) status, a PORTEN (enabled) status, a PORTRST (reset) status, a DELAY (waiting) status and a DONE (completion) status, may be included, wherein PORTEN maintains the reset sequence of each of the multiple sensors through a device table.

After the N-Box2 lower computer is powered on, it enters the IDLE status, and then jumps to the PORTEN status. After the N-Box2 lower computer enters the PORTEN status, it reads a next sensor from the device table, and then enters the PORTRST status. After the N-Box2 lower computer enters the PORTRST status, the next sensor is reset. After the next sensor is reset normally, the N-Box2 lower computer enters the DELAY status, and after the waiting time is reached, it returns to the PORTEN status and continues to read a next sensor from the device table until the multiple sensors are reset.

In an implementation manner, the processor is further configured to acquire a current status and an initial status of the next sensor to be reset, and determine that the next sensor to be reset is successfully reset when the current status is the same as the initial status. It should be noted that, as shown in FIG. 3, the PORTRST status maintains the initial status of each of the multiple sensors through a status table, for example, reg [15:0] status_table=16'b1111_0000_11110000, wherein each bit represents a sensor, and 0,1 represents whether it is turned on. After the sensor is reset, it may be judged whether the status of the sensor is switched to the initial status, and if the status is switched to the initial status, it is determined that the sensor is normally powered on.

In an implementation manner, the processor is further configured to: judge whether to return to a normal working status; if it is determined to return to the normal working status, switch the enabled status to a receiving status, and receive the operation instruction sent by the IPC; and if it is determined not to return to the normal working status, switch the enabled status to the waiting status. It should be noted that, as shown in FIG. 3, each time the N-Box2 lower computer enters the PORTEN status, it is first judged whether there are any unreset sensors. If there is an unreset sensor, it enters the PORTRST status. If there are no unreset sensors, the multiple sensors are reset, and then it is further judged whether to return to the normal working status, if it is determined not to return to the normal working status, it enters the DELAY status and continues to wait; if it is determined to return to the normal working status, it enters the DONE status to complete the power-on control function.

In an implementation manner, the processor is further configured to switch the receiving status to a sending status after the operation completion of the multiple sensors, and switch the sending status to the receiving status after sending the response data. It should be noted that the N-Box2 lower computer is in the receiving status when it is powered on. After the operation is completed, the status may be switched to the sending status to reply to the IPC, that is, to send the response data to the IPC and then switch to the receiving status.

In an implementation manner, the processor is further configured to receive a query instruction sent by the IPC, and send, in response to the query instruction, a query result to the IPC, the query result at least comprising: firmware version information of the multiple sensors. It should be noted that, in order to ensure that a firmware version burned into the sensor is convenient for later query, maintenance and update, the IPC needs to send a query instruction to query a sensor firmware version. The query result not only includes firmware version information of the sensor, but also includes: a hard board version, githash, compile time, maintenance personnel and other information.

In an implementation manner, the data collection device in the present embodiment further includes: a data interface. The processor is further configured to receive a change instruction through the data interface, and change a connection relationship of the multiple sensor modules in response to the change instruction. It should be noted that since multiple sensor modules are integrated on the circuit board, the connection relationship between the sensor modules can be easily modified, so that the data collection device of the embodiment of the disclosure has better flexibility and can adapt to multiple demands. For example, a change instruction from the IPC may be received through the data interface, or a change instruction from other devices may be received through the data interface. The processor may respond to the change instruction to open or close the connection between interfaces on the module to change the connection relationship between the modules.

In an implementation manner, the data collection device further includes: a housing and a base. The circuit board and the processor are fixedly arranged in the housing, and the base is configured to fix the data collection device on the target vehicle. It should be noted that since the base and the target vehicle are in direct contact and fixed relationship, an inertial navigation device may be arranged on the base, and traveling information of the vehicle, such as posture information of the vehicle, may be measured more accurately.

Figure 4:
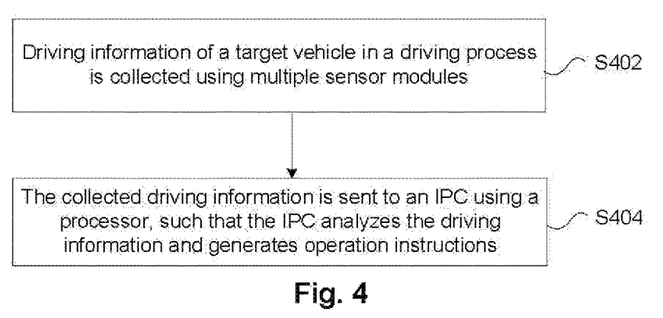
FIG. 4 is a flowchart of a data collection method according to an embodiment of the disclosure.

FIG. 4 is a flowchart of a data collection method according to an embodiment of the disclosure. According to another embodiment of the disclosure, a data collection method is provided, which is applied to the data collection device according to any one of the above and includes the following steps.

In step S402, traveling information of a target vehicle in a traveling process is collected using multiple sensor modules.

In step S404, the traveling information is sent to an IPC using a processor, such that the IPC analyzes the traveling information and generates operation instructions.

Through the above steps, traveling information of a target vehicle in a traveling process is collected using multiple sensor modules, and the traveling information is sent to an IPC using a processor, such that the IPC analyzes the traveling information and generates operation instructions. Therefore, the problems of complicated wiring and low stability of a data acquisition device in the related art can be solved, and the effect of high stability without wiring and switching devices can be achieved.

In an implementation manner, the method further includes: an operation instruction sent by the IPC is received using the processor, and the multiple sensors are controlled to be turned on or off respectively in response to the operation instruction using the processor.

In an implementation manner, the method further includes: after receiving the operation instruction, it is determined whether a device identifier carried in the operation instruction is consistent with a device identifier of the data collection device using the processor, and the operation instruction is responded using the processor when the device identifier carried in the operation instruction is consistent with the device identifier of the data collection device.

In an implementation manner, the method further includes: after receiving the operation instruction sent by the IPC, an instruction type of the operation instruction is determined using the processor, an operation corresponding to the instruction type is executed on the multiple sensors according to the instruction type of the operation instruction, and response data is sent to the IPC using the processor.

In an implementation manner, the method further includes: the multiple sensors are sequentially controlled to be reset in a resetting order using the processor, and the operation instruction sent by the IPC is received using the processor after the successful restoration of the multiple sensors.

In an implementation manner, the operation that the multiple sensors are sequentially controlled to be reset in a resetting order using the processor includes: an enabled status is entered after power-on, and a next sensor to be reset is acquired using the processor; the enabled status is switched to a reset status using the processor, and the processor is used to judge whether the next sensor to be reset is reset successfully; and if the next sensor to be reset is reset successfully, the reset status is switched to a waiting status using the processor, and after waiting for a preset time, the waiting status is switched to the enabled status using the processor.

In an implementation manner, the operation that the processor is used to judge whether the next sensor to be reset is reset successfully includes: a current status and an initial status of the next sensor to be reset are acquired using the processor, and it is determined that the next sensor to be reset is successfully reset using the processor when the current status is the same as the initial status.

In an implementation manner, the method further includes: the processor is used to judge whether to return to a normal working status; if it is determined to return to the normal working status, the enabled status is switched to a receiving status using the processor, and the operation instruction sent by the IPC is received; and if it is determined not to return to the normal working status, the enabled status is switched to the waiting status using the processor.

In an implementation manner, the method further includes: the receiving status is switched to a sending status using the processor after the operation completion of the multiple sensors, and the sending status is switched to the receiving status using the processor after sending the response data.

In an implementation manner, the method further includes: a query instruction sent by the IPC is received using the processor, and in response to the query instruction, a query result is sent to the IPC using the processor, the query result at least including: firmware version information of the multiple sensors.

In an implementation manner, the method further includes: a change instruction is received through a data interface using the processor, and a connection relationship of the multiple sensor modules is changed in response to the change instruction using the processor, the data collection device further including: the data interface.

According to yet another embodiment of the disclosure, an autonomous driving system is further provided, which includes the data collection device according to any one of the above.

In an implementation manner, a specific example in the present embodiment may refer to the examples described in the above embodiments and alternative implementation manners, and details are not described herein in the present embodiment.

Optional Embodiment

The above technical solutions of the embodiments of the disclosure are further explained below in conjunction with optional embodiments applied to specific scenarios, but are not used to limit the embodiments of the disclosure.

Figure 5:
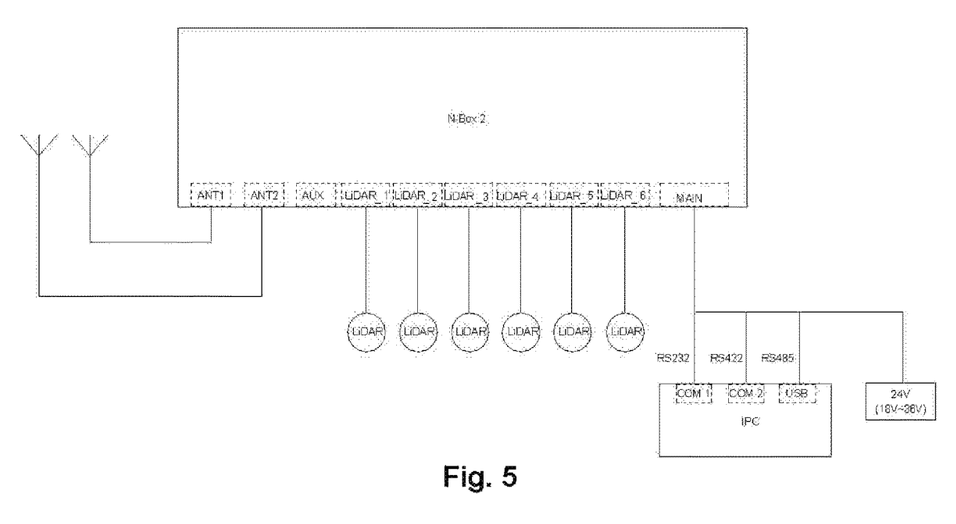
FIG. 5 is a structural block diagram of a data collection device according to an optional embodiment of the disclosure.

FIG. 5 is a structural block diagram of a data collection device according to an optional embodiment of the disclosure. As shown in FIG. 5, The data collection device of the embodiment of the disclosure may include at least one of a GNSS, an IMU, and a LIDAR module, and may also include an antenna module and an antenna interface (ANT1/2), an extension interface (AUX), a laser radar interface (LiDAR1-6), a main line interface (MAIN), etc. The antenna module is configured to realize the positioning of a vehicle, the antenna module is connected to an antenna through the antenna interface, and the antenna module receives or sends data through the antenna. The AUX is configured to connect other expansion devices to achieve more data collection functions. The LIDAR module may be connected to a peripheral device of the laser radar, and data collected by the peripheral device of the laser radar may be transferred through the laser radar interface to the LIDAR module in the data collection device of the present embodiment. The MAIN is configured to communicate with the IPC, and the MAIN is also responsible for power input. The IPC may acquire corresponding data through multiple serial ports such as three serial ports (RS232/RS422/RS485) to realize the control of the IPC over the data collection device.

Figure 6:
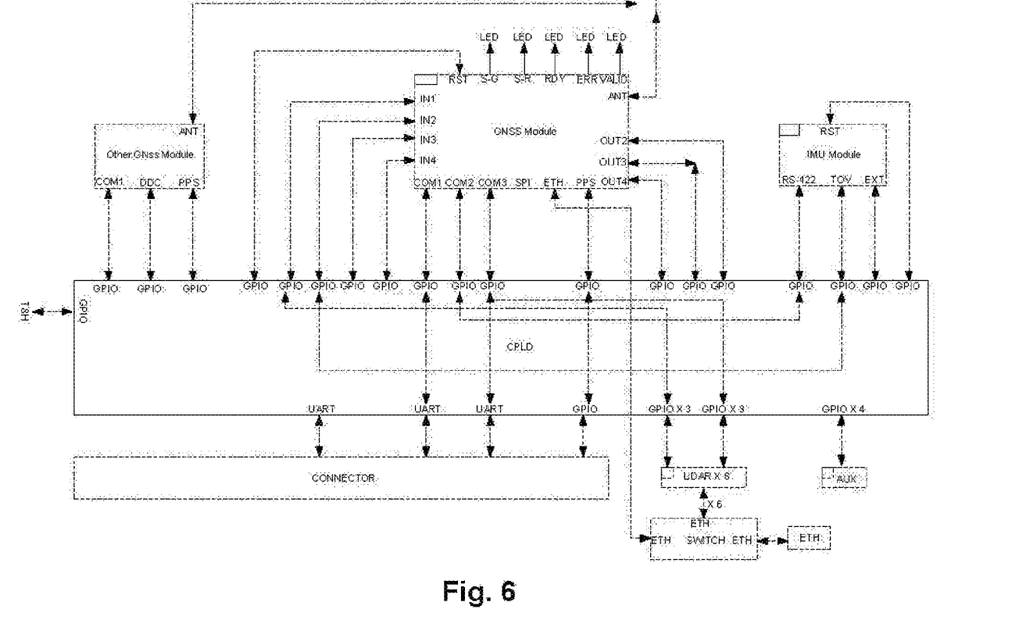
FIG. 6 is a schematic internal structure diagram of a data collection device according to an optional embodiment of the disclosure.

FIG. 6 is a schematic internal structure diagram of a data collection device according to an optional embodiment of the disclosure. As shown in FIG. 6, the data collection device of the embodiment of the disclosure includes a first GNSS module.

The first GNSS module is connected to an antenna, and the antenna is configured to assist the GNSS module to realize vehicle positioning. The first GNSS module may be provided with one or more IN interface, COM interfaces, SPI interfaces, ETH interfaces, PPS interfaces, OUT interfaces, ANT interfaces, VALID interfaces, ERR interfaces, RDY interfaces, S-R interfaces, S-G interfaces or RST interfaces. The VALID interface, the ERR interface, the RDY interface, the S-R interface, and the S-G interface may be connected with LEDs. The PPS interface may provide a laser radar with a second pulse signal for time alignment. The ETH interface is mainly configured to acquire LIDAR data. The ANT interface is mainly configured to connect main and auxiliary antennas.

The data collection device of the embodiment of the disclosure also includes a second GNSS module, which includes an ANT interface, a COM1 interface, a DDC interface, and a PPS interface. The COM1 interface is configured to communicate with an IPC to facilitate related configuration of a GNSS.

The data collection device of the embodiment of the disclosure also includes an IMU module. The IMU module includes an RS-422 interface, a TOV interface, an EXT interface, and an RST interface. The RS-422 interface may be connected to the COM interface of the first GNSS module through a GPIO to realize the interaction between the IMU module and the first GNSS module; or, the RS-422 interface may be connected to the COM interface of the second GNSS module through a GPIO to realize the interaction between the IMU module and the second GNSS module. The TOV interface may be connected to the IN interface of the first GNSS module through the GPIO. The EXT interface may be connected to other interfaces through the GPIO. The RST interface may also be connected to other interfaces through the GPIO. The RS-422 interface is used for the IPC to receive IMU data, RS232 is used for receiving GNSS positioning information, and TOV is used for external mode triggering.

The data collection device of the embodiment of the disclosure also includes a LiDAR module, an interface that is provided on the module and may be connected to a peripheral laser radar device, and an interface that may be connected to other modules included in the data collection device in the present embodiment. The laser radar module may be connected to the above first GNSS module, for example, may be connected to the first GNSS module through the IN interface and/or COM interface on the first GNSS module. The laser radar module is linked with the GNSS module, and the main function is to provide the laser radar with the pulse signal and positioning information.

The data collection device of the embodiment of the disclosure further includes a SWITCH (switch) module. The SWITCH module is provided with an ETH interface, and may be connected to other modules included in the data collection device of the embodiment of the disclosure through the ETH interface to realize network communication.

The data collection device in the embodiment of the disclosure further includes a connector (connector) module, which is configured to connect each interface on each module to realize the interaction between different modules. It should be noted that the connector module may realize the intercommunication of direct interfaces of various modules included in the data collection device of the embodiment of the disclosure, so that different modules can directly transfer data or switch information.

It should also be noted that, in the embodiment of the disclosure, the dotted line as shown in FIG. 4 indicates that the interfaces at both ends of the dotted line may be connected, which will not be repeated here, and different connection relationships may achieve different functions. The connection relationship between the interfaces may be changed through instructions or other means, such as opening a connection between two interfaces or closing a connection between two interfaces.

The basic functions of the firmware of the data collection device provided by the embodiment of the disclosure include:

(1) A time synchronization signal (PPS/GPRMC) of a GNSS receiver may be transferred to the laser radar and the IPC, and position information obtained from laser radar point cloud data and integrated navigation may be transferred to the IPC.

(2) A power-on sequence of different modules (Novatel, Lidar, power supply) may be controlled.

(3) When all peripherals start to work, the status of each module is queried and subjected to on-off control through the IPC.

Figure 7:
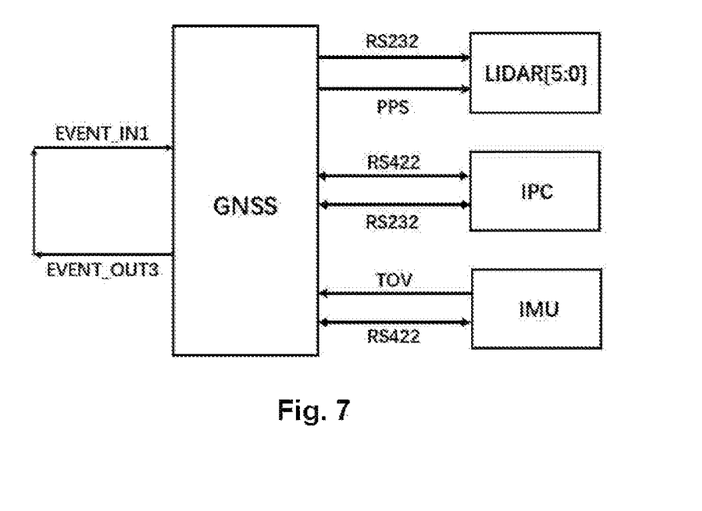
FIG. 7 is a schematic diagram of a structural connection between a data collection device and an IPC according to an optional embodiment of the disclosure.

FIG. 7 is a schematic diagram of a structural connection between a data collection device and an IPC according to an optional embodiment of the disclosure. As shown in FIG. 7:

The data collection device of the embodiment of the disclosure includes a GNSS module, a LIDAR module, and an IMU module. The GNSS module includes an input interface EVENT_IN1 and an output interface EVENT_OUT3. The GNSS module and the LIDAR module are connected through an RS232 interface and a PPS interface. The GNSS module and the IPC are connected through RS422 and RS232 interfaces. The GNSS module and the IMU module are connected through TOV and RS422 interfaces.

It should be noted that the power-on sequence control process of the data collection device in the present embodiment is as follows:

In step 1, GNSS and IMU power supplies are enabled.
In step 2, 1.1 v, 1.5 v, 2.5 v and 3.3 v switches are enabled.
In step 3, GNSS, IMU and switch are reset.
In step 4, a laser radar power supply (because the instantaneous current of laser radar power-on may reach 1.8-2 A, in order to ensure its normal operation, the delay is 2-3 s) is enabled.

Figure 8:
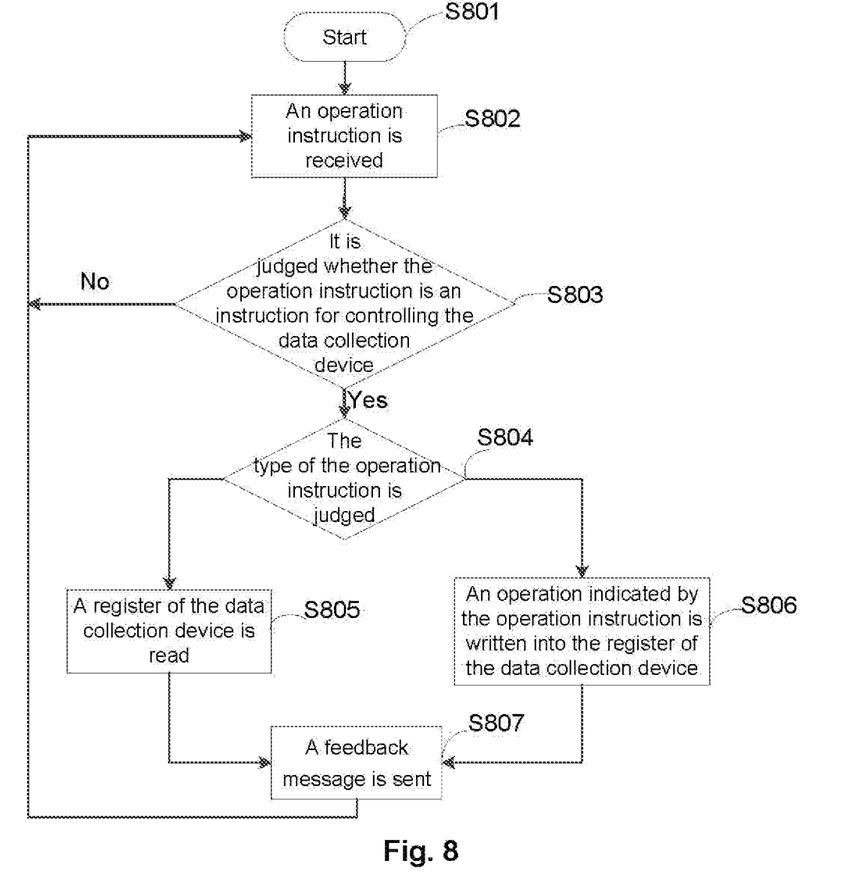
FIG. 8 is a flowchart of a data collection device receiving an operation instruction according to an optional embodiment of the disclosure.

FIG. 8 is a flowchart of a data collection device receiving an operation instruction according to an optional embodiment of the disclosure. As shown in FIG. 8, the flow includes the following steps.

In step S801, the flow starts.
In step S802, an operation instruction is received, and a data collection device receives the operation instruction sent by an IPC.

In step S803, it is judged whether the operation instruction is an instruction for controlling the data collection device. For example, it may be judged whether the operation instruction carries a device identifier of the data collection device. If the received operation instruction carries the device identifier of the data collection device, it may be considered that the operation instruction is an instruction for controlling the data collection device, and the next step S804 is continued. Otherwise the previous step may be returned to wait for receiving the operation instruction.

In step S804, the type of the operation instruction is judged, and after it is determined that the received operation instruction is the instruction for controlling the data collection device, an operation indicated by the operation instruction may be determined by judging the type of the operation instruction. If a read operation is indicated, step S805 is executed. If a write operation is indicated, step S806 is executed.

In step S805, a register of the data collection device is read.

In step S806, the operation indicated by the operation instruction is written into the register of the data collection device, and a corresponding operation is executed according to the indication of the operation instruction, for example, a certain sensor module is closed.

In step S807, a feedback message is sent.

Figure 9:
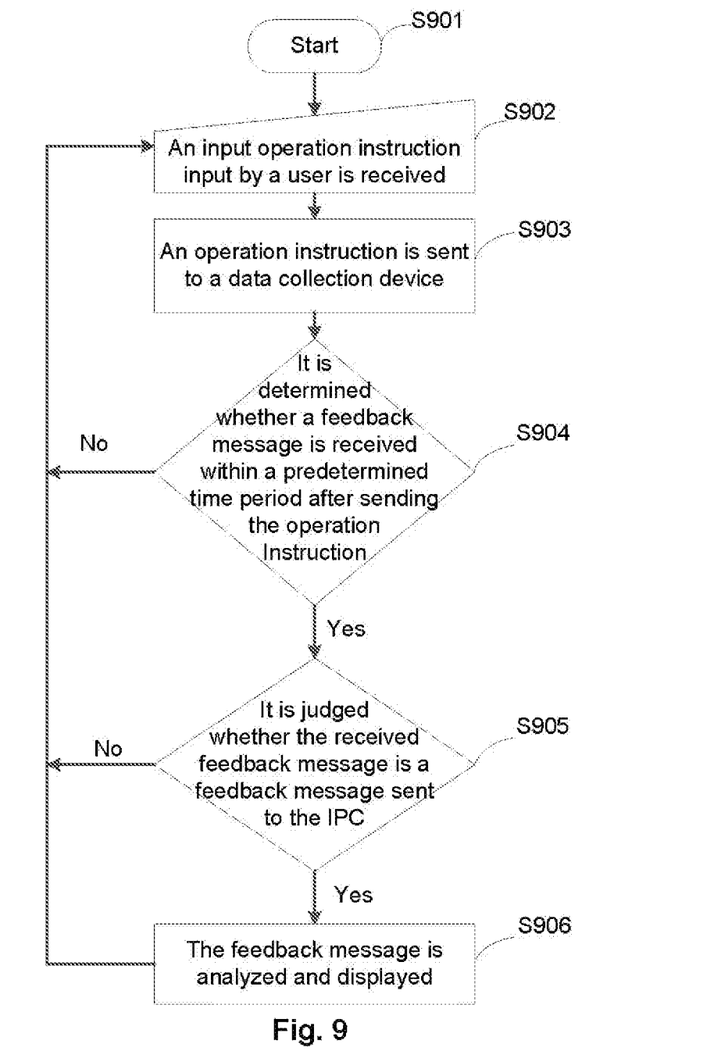
FIG. 9 is a flowchart of an IPC controlling a data collection device according to an optional embodiment of the disclosure.

FIG. 9 is a flowchart of an IPC controlling a data collection device according to an optional embodiment of the disclosure. As shown in FIG. 9, the flow includes the following steps.

In step S901, the flow starts.
In step S902, an input operation instruction input by a user is received.
In step S903, an operation instruction is sent to a data collection device.

In step S904, it is determined whether a feedback message is received within a predetermined time period after sending the operation instruction, if the feedback message is received, step S905 is performed, and otherwise, step S902 is returned. It should be noted that the predetermined time period may be 1 s. If a feedback message sent by the data collection device is received, it means that the operation instruction previously sent has been successfully received by the data collection device.

In step S905, it is judged whether the received feedback message is a feedback message sent to the IPC. If the received feedback message is the feedback message sent to the IPC, step S906 is performed, and if the received feedback message is not the feedback message sent to the IPC, step S902 is returned.

In step S906, the feedback message is analyzed and displayed.

Figure 10:
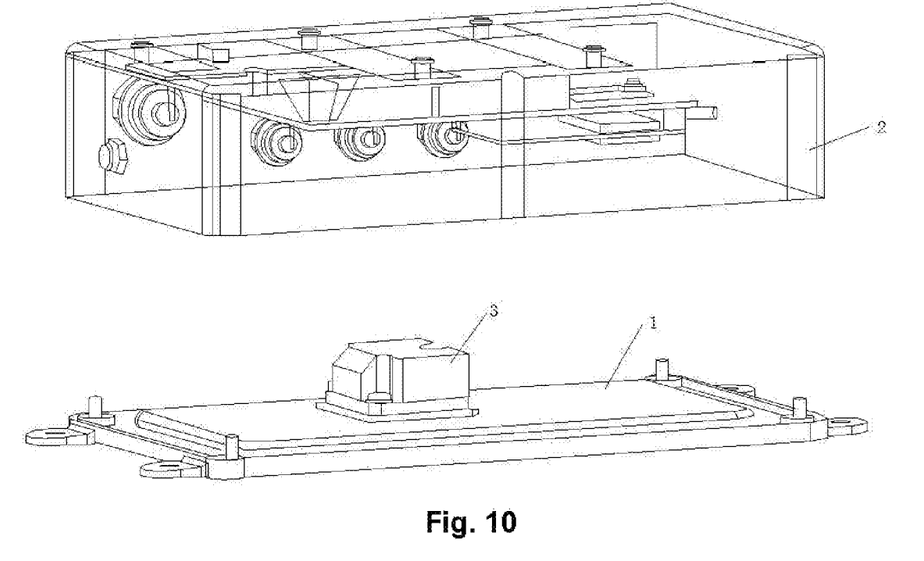
FIG. 10 is a schematic structure diagram 1 of a data collection device according to an embodiment of the disclosure.
Figure 11:
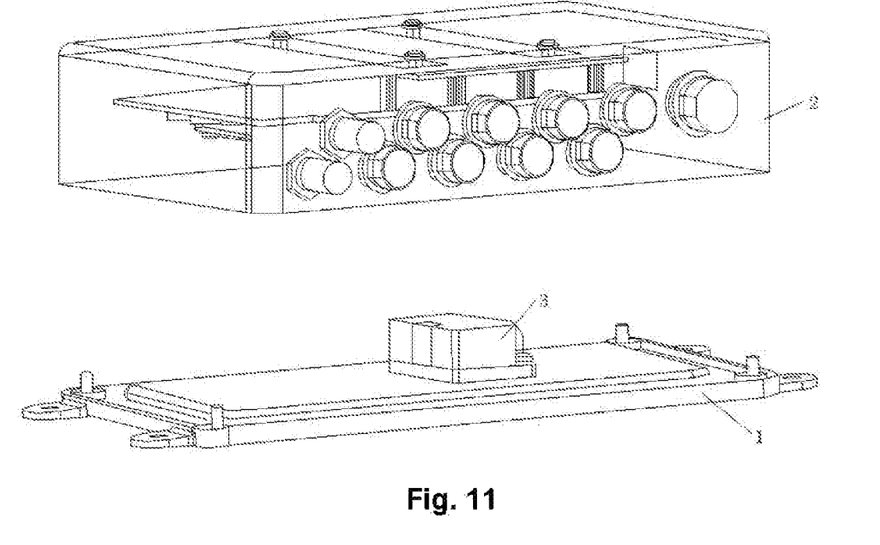
FIG. 11 is a schematic structure diagram 2 of a data collection device according to an embodiment of the disclosure.

The data collection device of the embodiment of the disclosure may be installed on the roof of a car and needs to be used outdoors, so the protection level may be set to IP67. FIG. 10 is a schematic structure diagram 1 of a data collection device according to an embodiment of the disclosure. FIG. 11 is a schematic structure diagram 2 of a data collection device according to an embodiment of the disclosure. As shown in FIG. 10 and FIG. 11, the data collection device may further include: a base 1 and an upper housing 2. The base 1 is configured to fix an inertial navigation device 3, and the upper housing 2 is configured to fix a related circuit board and output interface.

According to yet another embodiment of the disclosure, an autonomous driving system is further provided, which includes the data collection device according to any one of the above. The structure of the data collection device and the steps implemented are as described in any of the above, and will not be repeated here.

Through the description of the above implementation manners, those skilled in the art can clearly understand that the method according to the above embodiment may be implemented by means of software plus a necessary general hardware platform, and of course, may also be implemented through hardware, but in many cases, the former is a better implementation manner. Based on such understanding, the technical solution of the disclosure, which is essential or contributes to the conventional art, may be embodied in the form of a software product stored in a storage medium (such as a ROM/RAM, a magnetic disk and an optical disc), including a number of instructions for causing a terminal device (which may be a mobile phone, a computer, a server, or a network device, etc.) to perform the methods described in various embodiments of the disclosure.

It is apparent that a person skilled in the art shall understand that all of the above-mentioned modules or steps in the disclosure may be implemented by using a general calculation device, may be centralized on a single calculation device or may be distributed on a network composed of multiple calculation devices. Optionally, they may be implemented by using executable program codes of the calculation devices. Thus, they may be stored in a storage device and executed by the calculation devices, the shown or described steps may be executed in a sequence different from this sequence under certain conditions, or they are manufactured into each integrated circuit module respectively, or multiple modules or steps therein are manufactured into a single integrated circuit module. Thus, the disclosure is not limited to the combination of any specific hardware and software.

The above is only the preferred embodiments of the disclosure, not intended to limit the disclosure. As will occur to those skilled in the art, the disclosure is susceptible to various modifications and changes. Any modifications, equivalent replacements, improvements and the like made within the principle of the disclosure shall fall within the scope of protection of the disclosure.

What is claimed is:

1. A data collection device, comprising:
a circuit board, integrated with a plurality of sensor modules for collecting traveling information of a target vehicle in a traveling process; and
a processor, connected to the circuit board, and configured to send the traveling information to a computing device such that the computing device analyzes the traveling information and generates operation instructions; and
a data interface, wherein the processor is further configured to receive a change instruction through the data interface, and change a connection relationship of the plurality of sensor modules in response to the change instruction.

2. The data collection device as claimed in claim 1, wherein the processor is further configured to receive an operation instruction sent by the computing device, and control, in response to the operation instruction, the plurality of sensor modules to be turned on or off respectively.

3. The data collection device as claimed in claim 2, wherein the processor is further configured to determine, after receiving the operation instruction, whether a device identifier carried in the operation instruction is consistent with a device identifier of the data collection device, and respond to the operation instruction when the device identifier carried in the operation instruction is consistent with the device identifier of the data collection device.

4. The data collection device as claimed in claim 3, wherein the processor is further configured to determine whether an address code in the operation instruction is consistent with a preset address code of the data collection device, and determine, if the address code is consistent with the preset address code, that the device identifier carried in the operation instruction is consistent with the device identifier of the data collection device.

5. The data collection device as claimed in claim 2, wherein the processor is further configured to determine, after receiving the operation instruction sent by the computing device, an instruction type of the operation instruction, execute an operation corresponding to instruction types of the plurality of sensor modules according to the instruction type of the operation instruction, and send response data to the computing device.

6. The data collection device as claimed in claim 5, wherein the processor is further configured to determine the instruction type of the operation instruction based on a function code in the operation instruction.

7. The data collection device as claimed in claim 5, wherein the processor is further configured to read data corresponding to the operation instruction from the plurality of sensor modules to obtain the response data when the instruction type of the operation instruction is a read operation type, write the data corresponding to the operation instruction to the plurality of sensor modules based on the operation instruction when the instruction type of the operation instruction is a write operation type, and determine that the response data is write operation instruction.

8. The data collection device as claimed in claim 5, wherein the processor is further configured to sequentially control the plurality of sensor modules to be reset in a resetting order, and receive the operation instruction sent by the computing device after successful reset of the plurality of sensor modules.

9. The data collection device as claimed in claim 8, wherein the processor is further configured to: enter an enabled status after power-on, and acquire a next sensor to be reset; switch the enabled status to a reset status, and determine whether the next sensor to be reset is reset successfully; and if the next sensor to be reset is reset successfully, switch the reset status to a waiting status, and after waiting for a preset time, switch the waiting status to the enabled status.

10. The data collection device as claimed in claim 9, wherein the processor is further configured to acquire a current status and an initial status of the next sensor to be reset, and determine that the next sensor to be reset is reset successfully when the current status is the same as the initial status.

11. The data collection device as claimed in claim 9, wherein the processor is further configured to: determine whether to return to a normal working status; if the processor determines to return to the normal working status, switch the enabled status to a receiving status, and receive the operation instruction sent by the computing device; and if the processor determines not to return to the normal working status, switch the enabled status to the waiting status.

12. The data collection device as claimed in claim 11, wherein the processor is further configured to switch the receiving status to a sending status after the operation instruction of the plurality of sensor modules, and switch the sending status to the receiving status after sending the response data.

13. The data collection device as claimed in claim 1, wherein the processor is further configured to receive a query instruction sent by the computing device, and send, in response to the query instruction, a query result to the computing device, the query result at least comprising: firmware version information of the plurality of sensor modules.

14. The data collection device as claimed in claim 1, further comprising: a housing and a base, wherein the circuit board and the processor are fixedly arranged in the housing, and the base is configured to fix the data collection device on the target vehicle.

15. A data collection method, comprising:
collecting traveling information of a target vehicle in a traveling process using a plurality of sensor modules; and
sending the traveling information to a computing device using a processor, such that the computing device analyzes the traveling information and generates operation instructions; and
receiving a change instruction through the data interface, and changing a connection relationship of the plurality of sensor modules in response to the change instruction.

16. The data collection method as claimed in claim 15, further comprising:
receiving, using the processor, an operation instruction sent by the computing device, and controlling, using the processor, the plurality of sensor modules to be turned on or off respectively in response to the operation instruction.

17. The data collection method as claimed in claim 16, further comprising:
determining, using the processor after receiving the operation instruction, whether a device identifier carried in the operation instruction is consistent with a device identifier of the data collection device, and responding to the operation instruction using the processor when the device identifier carried in the operation instruction is consistent with the device identifier of the data collection device.

18. The data collection method as claimed in claim 15, further comprising:
determining, using the processor after receiving the operation instruction sent by the computing device, an instruction type of the operation instruction, executing, using the processor, an operation corresponding to instruction types of the plurality of sensor modules according to the instruction type of the operation instruction, and sending, using the processor, response data to the computing device.

19. An autonomous driving system, comprising the data collection device according to claim 1.

* * * * *